(12) United States Patent
Sangle-Ferriere

(10) Patent No.: US 11,914,754 B2
(45) Date of Patent: *Feb. 27, 2024

(54) CRYPTOGRAPHIC METHOD FOR VERIFYING DATA

(71) Applicant: Bruno Sangle-Ferriere, Paris (FR)

(72) Inventor: Bruno Sangle-Ferriere, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,123

(22) Filed: Feb. 18, 2020

(65) Prior Publication Data

US 2021/0165914 A1    Jun. 3, 2021

(30) Foreign Application Priority Data

Feb. 19, 2019  (FR) ........................................ 1901648

(51) Int. Cl.
| | | |
|---|---|---|
| *H04L 29/06* | (2006.01) | |
| *G06F 21/64* | (2013.01) | |
| *H04L 9/06* | (2006.01) | |
| *H04L 9/32* | (2006.01) | |

(52) U.S. Cl.
CPC ............ *G06F 21/64* (2013.01); *H04L 9/0643* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 6,104,811 A | * | 8/2000 | Aiello | ............... H04L 9/0662 380/46 |
| 9,565,022 B1 | * | 2/2017 | Robshaw | ............... H04L 9/14 |
| 10,193,695 B1 | * | 1/2019 | Endress | ............... G06F 18/214 |
| 10,362,169 B1 | * | 7/2019 | Sanderlin | ............ H04M 3/493 |
| 10,891,366 B1 | * | 1/2021 | Wu | ..................... H04L 9/0894 |
| 2011/0116096 A1 | * | 5/2011 | Welch | ..................... G01B 9/02 356/450 |

(Continued)

FOREIGN PATENT DOCUMENTS

| | | |
|---|---|---|
| CN | 101547184 A | 9/2009 |
| EP | 1421548 A1 | 5/2004 |
| WO | 03/007228 A1 | 1/2003 |

OTHER PUBLICATIONS

Preliminary Search Report for FR 1901648 dated Nov. 14, 2019 (2 pages).

(Continued)

*Primary Examiner* — Eleni A Shiferaw
*Assistant Examiner* — Hassan A Hussein
(74) *Attorney, Agent, or Firm* — Baker & McKenzie LLP

(57) ABSTRACT

A method, implemented by at least one apparatus, for comparing a first dataset and a second dataset, in particular with a view for determining whether these two datasets are identical. The method not requiring the presence of these two datasets in the apparatus, and including the following steps of: a) mixing a number, called the mixer number, with the first dataset, using a mixing function, in order to obtain mixed data, b) hashing the mixed data using a hash function, and c) comparing the hash thus obtained in step b) with a third dataset assumed to be the hash of the second dataset mixed with the same mixer number as that used in step a) and with the same mixing function.

20 Claims, 4 Drawing Sheets

(56) References Cited

U.S. PATENT DOCUMENTS

| | | | | |
|---|---|---|---|---|
| 2011/0246433 | A1* | 10/2011 | Sun | G06F 16/10 |
| | | | | 707/698 |
| 2012/0057702 | A1* | 3/2012 | Minematsu | H04L 9/3242 |
| | | | | 380/255 |
| 2012/0143765 | A1* | 6/2012 | Yamaguchi | G06F 21/10 |
| | | | | 705/52 |
| 2014/0298038 | A1* | 10/2014 | Gauravaram | H04L 9/0643 |
| | | | | 713/189 |
| 2014/0351593 | A1* | 11/2014 | Anson | H04L 63/0428 |
| | | | | 713/168 |
| 2014/0364098 | A1* | 12/2014 | Ueno | H04M 1/0202 |
| | | | | 455/566 |
| 2015/0261502 | A1* | 9/2015 | Sartor | G06F 7/588 |
| | | | | 359/107 |
| 2018/0068127 | A1* | 3/2018 | Hamano | G06F 21/10 |
| 2018/0176011 | A1* | 6/2018 | Hars | H04L 9/0861 |
| 2018/0248686 | A1* | 8/2018 | Alakuijala | H04L 9/0643 |
| 2018/0248687 | A1* | 8/2018 | Wassenberg | H04L 9/3242 |
| 2018/0324152 | A1* | 11/2018 | Jarchafjian | H04W 12/63 |
| 2018/0367540 | A1* | 12/2018 | Miranda | H04L 9/0822 |
| 2019/0080189 | A1* | 3/2019 | Van Os | G06F 3/016 |
| 2019/0102782 | A1* | 4/2019 | Diehl | H04L 9/3263 |
| 2019/0109715 | A1* | 4/2019 | Hars | H04L 9/0631 |
| 2020/0034050 | A1* | 1/2020 | Brasfield | G06F 12/084 |
| 2020/0068244 | A1* | 2/2020 | Hunacek | H04N 21/4181 |
| 2020/0110905 | A1* | 4/2020 | O'Cleirigh | G06F 21/51 |
| 2020/0226952 | A1* | 7/2020 | Lightowler | H04L 9/0637 |
| 2020/0236092 | A1* | 7/2020 | von Vistauxx | H04L 9/40 |
| 2020/0351100 | A1* | 11/2020 | Sangle-Ferriere | |
| | | | | H04L 63/0435 |
| 2021/0382817 | A1* | 12/2021 | Tajima | G06F 11/3688 |
| 2022/0085984 | A1* | 3/2022 | Khandani | H04L 9/0631 |
| 2023/0094612 | A1* | 3/2023 | Chen | G06N 10/70 |
| | | | | 714/746 |

OTHER PUBLICATIONS

Final Rejection for U.S. Appl. No. 16/934,376, dated Dec. 9, 2022 (69 pages).

Foreign Examination Report dated Mar. 8, 2023 in connection with Indian Application No. 202127035375, 7 pages.

International Search Report and Written Opinion dated Apr. 21, 2020 in connection with International Application No. PCT/EP2020/054126, 10 pages.

USPTO Private Patent Application Information Retrieval for U.S. Appl. No. 18/072,962, on Mar. 1, 2023.

USPTO Patent Center Documents for U.S. Appl. No. 16/934,376 on Mar. 1, 2023.

* cited by examiner

[Fig. 1]
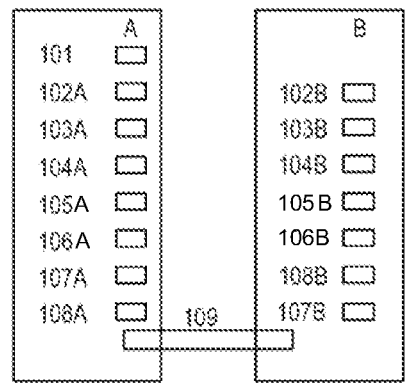
[Fig. 2]
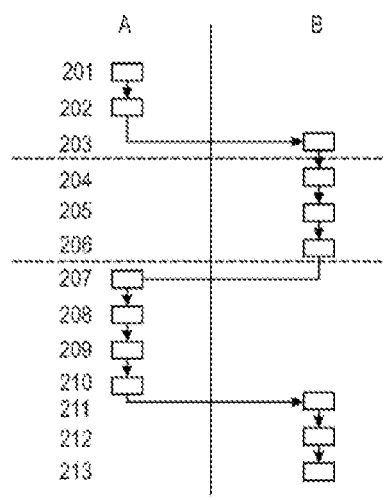
[Fig. 3]
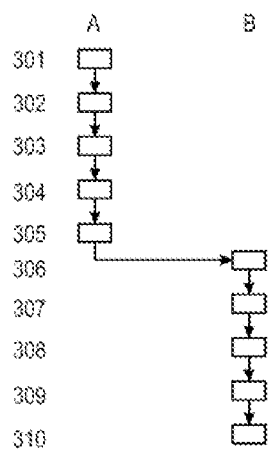

[Fig. 4]
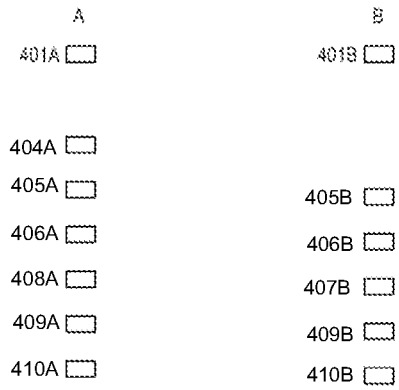
[Fig. 5]
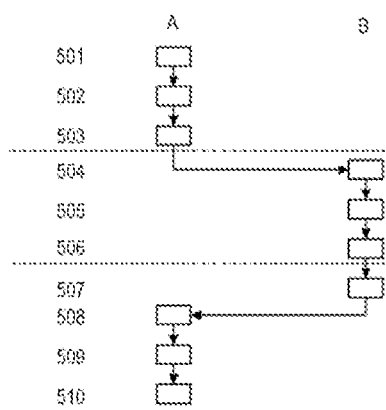
[Fig. 6]
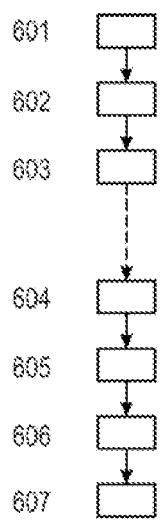

[Fig. 7]
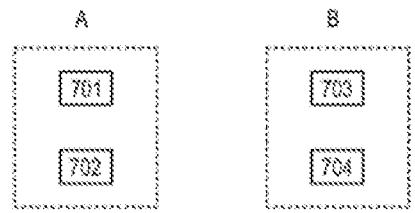
[Fig. 8]
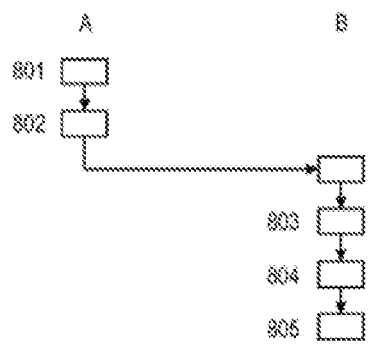
[Fig. 9]
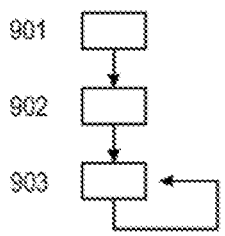
[Fig. 10]
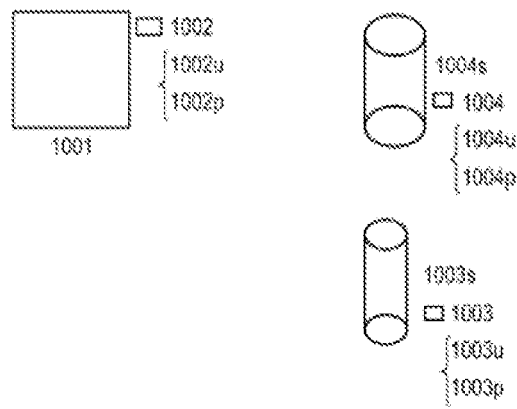

[Fig. 11]
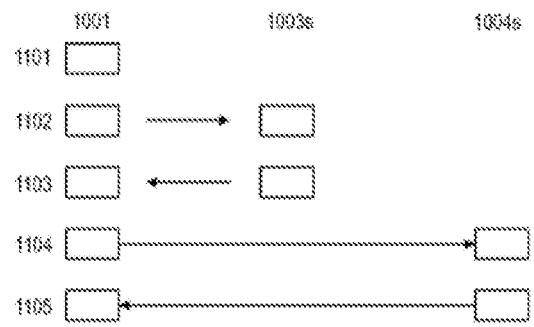
[Fig. 12]
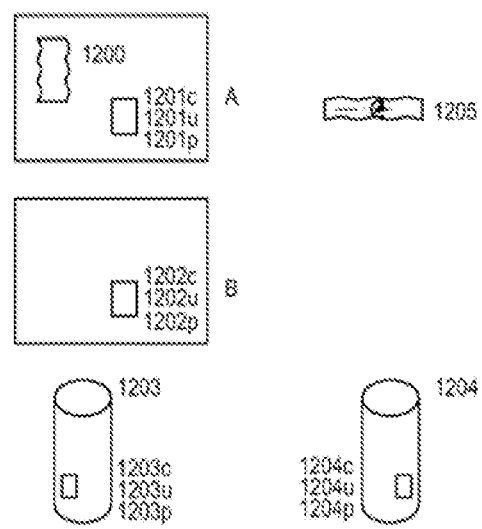
[Fig. 13]
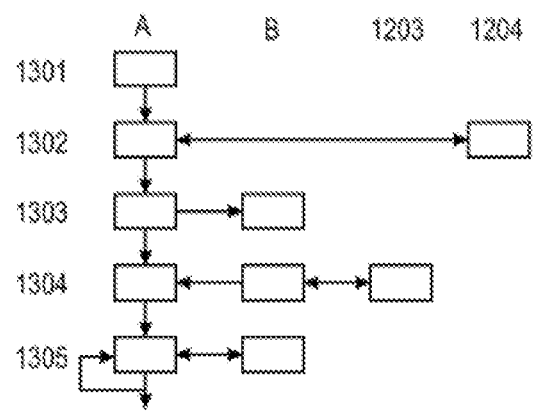

CRYPTOGRAPHIC METHOD FOR VERIFYING DATA

TECHNICAL FIELD

The present invention relates to digital cryptography and to the security of computational and electronic devices, and in particular to digital signatures.

BACKGROUND

Computers and electronic apparatuses are often connected to a network, physically, wirelessly, by RFID, or by any other secure or unsecure means, and sometimes need to know the identity of the apparatus that has sent them certain data, for example in order to ensure that these data have not been transmitted by another apparatus, which intercepted them and modified them before sending them on to the legitimate recipient, or quite simply to identify beyond a shadow of a doubt the identity of the sender of the data, which is for example an automobile on a road network or an RFID tag worn by a competitor during a sporting event, or for any other reason why the identity of the sender of the data is important to the recipient.

The transmitted data may be sent entirely encrypted with a key attributed to the sender. However, the encryption of all of the data makes the use of single-use keys (one-time pads) difficult. Specifically, the encryption of all of the data is a method that uses keys that are as long as the data that they encrypt, and these keys must be renewed after use.

It is therefore necessary for computers or other electronic devices entering into communication, for example via the exchange of text, identifiers, numbers, computer programs, images or video or audio codes, to verify the identity of the sending device using the encryption of an amount of data smaller than the amount of data sent. It is for this reason that an electronic signature consisting in encrypting a hash of the data is used. The term "hash" is used to refer to the result of a hash function that, on the basis of an initial datum provided as input, computes a fingerprint that serves to rapidly, though incompletely, identify the initial datum. It is common to send, with the data, an encrypted hash that will then be decrypted by the recipient, then compared to the hash of the received data. MD5, SHA1 and SHA256 are algorithms conventionally used for such hashing operations. However, data hashes are generally much smaller in size than the original data, and it may be possible to create other data, similar but slightly different to the original data, having a hash equal to the hash of the original data. These data could therefore be substituted for the original data, without being rejected lay the procedure for verifying the hash. Any type of data may be substituted, but the detectability by the user of the substitution decreases as the complexity of the data increases (a long text, an audio file, a photo or a video). To make the substitution, it is not even necessary to decrypt the encrypted hash. It is enough to simply compute the hash of the original data. Furthermore, hash functions such as MD5 and SHA1 are hash functions that are at the present time relatively easy to bypass.

The quantum computers that are in the process of being developed should soon be capable of bypassing the security provided by hash functions, since they are capable of optimizing the start files so that they have a preset hash.

Methods for improving the security of systems using hashing techniques are known in the prior art.

Patent application CN101547184 uses a plurality of auxiliary authentication values that are exchanged between a server and users.

In the method proposed in patent application US2011/0246433, a hash of the data to be sent is generated and concatenated with the data chunk to be sent and a random number tag.

Patent application EP 1 421 548 describes a method for transmitting information, in which a message to be sent is concatenated with a random number then hashed. The result of the hashing is sent unencrypted to the other party. The message is sometimes transmitted as such or encrypted. The random number is always transmitted signed, and optionally encrypted, to the other party. The fact of not encrypting the hash when the message is itself not encrypted makes the transmission vulnerable to very powerful or quantum computers that are able to compute random numbers compatible with the unencrypted message and the result of the hash. Moreover, encrypting the entire message has the drawback, if such an encryption uses one-time pads, which are supposed to be uncrackable, of requiring both the two corresponding parties to have access to such shared keys.

SUMMARY

There is a need to further improve the security of hashing techniques, decreasing the probability of error in the verification of data, and, where appropriate, allowing a more reliable authentication of the sender of these data.

The invention in particular aims to meet this need, and it achieves this aim by virtue of a method, implemented by a least one apparatus, for comparing a first dataset and second dataset, in particular with a view to determining whether these two datasets are identical, this method comprising the following steps:

a) mixing a number, called the mixer number, with the first dataset, using a mixing function, in order to obtain mixed data, b) hashing the mixed data using a hash function, and c) comparing the hash thus obtained in step b) with a third dataset assumed to be the hash of the second dataset mixed with the same mixer number as that used in step a) and with the same mixing function.

By virtue of the invention, and in particular of the mixing of the first dataset with a mixer number prior to the hashing, it becomes very improbable to be able to create data similar to this first dataset that, after having been mixed with the same mixing number, will have the same hash is the mixed first dataset.

Preferably, the method according to the invention does not require two datasets to be simultaneously present in the apparatus.

Preferably, the mixer number is generated randomly.

The mixer number is preferably generated by the apparatus. As a variant, the mixer number is generated by another trusted apparatus.

The generation of the mixer number may be based on a pair of input values that are physical quantities at least one of which varies continuously, such as for example the temperature and the time, or on a quantum phenomenon. For example, such a generation may be based on which of two Young's slits a photon chooses to use to pass through a plate.

Preferably, the mixing operation in step a) is carried out by the apparatus. As a variant, the mixing is carried out by another trusted apparatus.

The mixing function combines the first dataset and the mixer number. It is, preferably, an XOR logic function that adds the bits of the first dataset and those of the mixer number, one by one. Since the size of the mixer number is generally smaller than the size of the first dataset, it is possible to add via an XOR the bits of the mixer number to the first or last bits of the first dataset.

The mixer number may have the same size as the first dataset. In this case, the addition via the XOR function is carried out on all the bits, one by one.

Alternatively, the mixing function consists in adding the mixer number to the end of the first dataset.

The mixing function may even be an encrypting function using the mixer number as encryption key to encrypt the first dataset.

Preferably, the data in step b) are hashed by the apparatus. As a variant, the hashing is carried out by another trusted apparatus.

Preferably, the hash function is chosen among SHA1, SHA2, SHA256 and MD5 and the Jenkins function.

A first variant of the method according to the invention is a method for verifying with the apparatus the integrity of a message originating from a sender, the method comprising:
  i. the apparatus receiving the message and an identifier of the message, said message forming the first dataset,
  ii. generating the mixer number,
  iii. implementing steps a) and b), in which the message is mixed with the mixer number then hashed,
  iv. optionally encrypting the mixer number,
  v. the apparatus sending the identifier of the message and the optionally encrypted mixer number to the sender of the message,
  vi. the apparatus receiving the encrypted third dataset, preferably with the identifier of the message, originating from the sender,
  vii. decrypting the third dataset, and
  viii. implementing step c), the integrity of the message being ensured if the third dataset decrypted in step vii and the hash obtained in step b) are identical.

By "integrity" of the message, what must be understood is its non-alteration, for example by a malicious third-party that intercepted it during its transmission.

The identifier of the message may be a sequence of alphanumeric characters and/or signs able to be converted into a digital word via an ASCII code inter alia.

The identifier of the message may contain the identifier of the sender and an order number of the message.

The authentication of the sender is in particular ensured by the decrypting operation in step vii.

This first variant of the invention makes it possible to ensure both the integrity of the received message and of the identity of the sender of the message.

The steps relating to sending and receiving the data may be carried out using the same communication protocol, or using different communication protocols. For example, the data received in step i are received via Wi-Fi, the data sent in step v are sent via 4G and the data received in step vi are received via WiMAX.

In step i, the apparatus may also receive an identifier of the sender. This identifier is useful if the apparatus is able to receive messages from various senders, such an identifier allowing it to choose the encryption keys to be used to encrypt or decrypt the information exchanged with the sender during the encrypting and decrypting operations described in this first variant of the invention.

Preferably, the method according to this first variant comprises, between steps v and vi:
  the sender receiving the identifier of the message and the optionally encrypted mixer number,
  optionally decrypting the mixer number,
  identifying, using the identifier of the message, the message sent to the apparatus,
  mixing the message with the optionally decrypted mixer number using the mixing function,
  hashing the data resulting from the preceding step using the hash function,
  encrypting the hash resulting from the preceding step, and
  sending to the apparatus the encrypted hash preferably with the identifier of the message.

The optional encryption of the mixer number in step iv is preferably carried out by the apparatus.

The optional encryption of the mixer number makes it possible to prevent this number from being intercepted and altered by a malicious third-party.

Preferably, the optional encryption of the mixer number is carried out using a single-use key of a size at least equal to that of the number. Since the key is single-use, a new key is used each time a mixer number is sent.

The encryption may also be carried out using a symmetric key. The symmetric encryption key is kept secret between the sender and the apparatus, and is preferably renewed after a certain number of transmissions.

Alternatively, the optional encryption of the mixer number is asymmetric, being carried out either using a public key of the sender known to the apparatus, so as to allow the decryption by the sender using its associated private key, or using a private key of the apparatus the public key of which is known to the sender.

Thus, a third party is prevented from learning or altering the mixer number.

Preferably, the decryption in step vii is carried out by the apparatus.

Preferably, the decryption in step vii is carried out using a symmetric key, if the encryption in step iv is carried out using a single-use key.

Alternatively, the decryption in step vii is carried out using a single-use key, if the encryption in step iv is carried out using a symmetric key.

The decryption in step vii may also be carried out using other methods, for example using a public key known to the apparatus, associated with a private key of the sender having served to encrypt the hash received in step vi. Thus, the apparatus is capable of certifying the identity of the sender.

The mixer number may have the same size as the symmetric key that serves to encrypt it, if such a symmetric key is used, and also the same size as the hash.

Preferably, the private, symmetric and single-use encryption keys and the mixer numbers are unguessable and unobservable by third-party devices, to prevent listening to the data sent by the sender or the apparatus from making it possible to generate and transmit fraudulent second datasets that would cause the integrity of messages received by the apparatus but transmitted by a sender other than that legitimately supposed to hold said keys to be wrongly recognized.

If the encryption key X of the mixer number x is known, then the hash of the mixed message may be known, because it is enough to decrypt the encryption of x and to compute the mixture of the message before hashing it. The key Y encrypting the hash may then also be guessed or known to belong to a small universe, the hash of the mixed message and its encryption with Y both being known or observable. The encryption key Y is therefore a function F of the encryption key X, or else the encryption key Y belongs to a universe depending on the encryption key X. The observation of a plurality of transmissions causes a plurality of functions to appear, and the values of the keys X and Y are at the intersection of these functions. It is preferable to avoid this situation. It is therefore recommended either to use, for the key X or the key Y, values that change over the course of the transmissions, or to use encrypting functions such that, for each observation of exchanges of the triplet "message, encrypted number, encrypted hash", the universe of the keys Y for each possible X is large; this making the universe resulting from the intersection of these universes deducible at each observation large. It is not recommended to take, for the key Y, the randomly generated mixer number x. Specifically, if the mixer number x is used as encryption key Y, or indeed if the key Y is computed depending on the mixer number x using a defined formula, knowing the encrypted value C of the mixer number x encrypted with the key X, the mixer number x, and therefore Y, becomes another function G of the key X; and the keys X and Y would be at the intersection of the function and, of this new function G. Preferably, the key X or the key Y is renewed after each exchange.

The apparatus may furthermore comprise a counter of consecutive failed verification attempts that triggers a blockage thereof when a defined number is reached, the apparatus possibly being unblocked during the renewal of the encryption key used to encrypt the mixer number or the encryption key used to encrypt the hash.

A second variant of the method according to the invention is a method for verifying with the apparatus the integrity of a message originating from a sender, the method comprising:
  i. the apparatus receiving the message, the encrypted third dataset and the encrypted mixer number,
  ii. decrypting the mixer number and the third dataset, and
  iii. implementing steps a) to c), the integrity of the message being ensured if the hash obtained in step b) and the third dataset decrypted in step ii are identical.

Preferably, the method according to this second variant of the invention comprises, before step i:
  the sender generating the mixer number,
  mixing the mixer number with the message, using the mixing function,
  hashing the data resulting from the preceding step using the hash function,
  encrypting the hash resulting from the preceding step and forming the third dataset,
  encrypting the mixer number, and
  sending, to the apparatus, the message, the encrypted third dataset and the encrypted mixer number.

These steps are carried out by the genuine sender and allow the alteration of the message by an unauthorized third party to be detected.

The decryption in step ii of the mixer number and of the third dataset is preferably carried out by the apparatus.

Preferably, the encryption of the mixer number is carried out using a single-use key, and the encryption of the third dataset is carried out using a symmetric key, the symmetric key preferably being renewed occasionally.

Alternatively, the encryption of the mixer number is carried out using a symmetric key, and the encryption of the third dataset is carried out using a single-use key, the symmetric key preferably being renewed occasionally.

The encryption of the mixer number and the encryption of the third dataset may also be of the same type, or of different types, these types of encryption possibly employing symmetric keys, or asymmetric keys.

If a pair of asymmetric keys is used for the encryption of the mixer number, the private key of said pair is preferably kept by the apparatus, the corresponding public key then being known to the sender.

The encryption of the third dataset is, preferably, carried out using a private key kept by the sender, the corresponding public key then being known to the apparatus.

Thus, by decrypting the mixer number and the third dataset, the apparatus is capable of certifying the identity of the sender.

The encryption of the mixer number and that of the third dataset may be carried out using the same encrypting function, in particular when the encryption of the mixer number is asymmetric.

Alternatively, the encryption of the mixer number and that of the third dataset are carried out by two different encrypting functions.

Preferably, the types of encrypting functions to be used form part of the configuration of the sender and of the apparatus, prior to the setup of the communication between the latter two.

A third variant of the method according to the invention is a method in which the first dataset is present in the apparatus and the second dataset is present in a second apparatus, the method comprising:
  i. implementing steps a) and b),
  ii. encrypting the mixer number,
  iii. the apparatus sending, to the second apparatus, the encrypted mixer number,
  iv. the apparatus receiving an encrypted hash of the second dataset,
  v. decrypting the encrypted hash, and
  vi. implementing step c).

Preferably, the method according to this third variant of the invention comprises, between steps iii and iv:
  the second apparatus receiving the encrypted mixer number,
  decrypting the mixer number,
  creating a modified copy of the second dataset using the mixer number and the mixing function,
  hashing the modified copy of the second dataset using the hash function,
  encrypting the hash resulting from the preceding step and forming the third dataset, and
  the second apparatus sending, to the apparatus, the encrypted hash of the second dataset.

The encryption of the mixer number in step ii and the decryption of the encrypted hash in step v are preferably carried out by the apparatus.

Preferably, the encryption of the mixer number is carried out using a symmetric encryption key shared with the second apparatus.

Preferably, the encryption of the hash is carried out using a single-use key and the encryption of the mixer number is carried out using a symmetric key that is renewed occasionally.

Alternatively, the encryption of the mixer number is carried out using a single-use key and the encryption of the hash is carried out using a symmetric key that is renewed occasionally.

The encryption of the mixer number and the encryption of the hash may also be of the same type, or of different types, these types of encryption possibly employing symmetric keys, in particular single-use keys, or asymmetric keys.

A fourth variant of the method according to the invention is a method for verifying that a dataset present in the apparatus has not been modified between two times d1 and d2, this dataset forming, at the time d1, the first dataset and, at the time d2, the second dataset, the method comprising:
  i. implementing steps a) and b),
  ii. the apparatus securely saving the mixer number and the hash obtained in step b),
  iii. creating a modified copy of the second dataset using the mi r number and the mixing function,
  iv. hashing the modified copy using the hash function to form the third dataset, and
  v. implementing step c).

Advantageously, the method according to this fourth variant does not require the dataset to be kept securely.

Another subject of the invention is a computer-program product containing instructions readable by a processor of an apparatus for implementing the method according to the invention, according to any one of the variants defined above.

BRIEF DESCRIPTION OF THE DRAWINGS

The invention will possibly be better understood on reading the following detailed description of nonlimiting examples of implementation thereof, and on examining the appended drawings, in which:

FIG. 1 schematically shows the data and functions necessary to implement the invention according to its first or its second variant, FIG. 2 schematically illustrates an example of implementation of the invention according to its first variant, FIG. 3 schematically shows an example of implementation of the invention according to its second variant, FIG. 4 schematically illustrates the data and functions used to implement the invention according to its third variant, FIG. 5 schematically shows an example of implementation of the invention according to its third variant, FIG. 6 illustrates a scheme of implementation of the invention according to its fourth variant, FIG. 7 schematically illustrates the data used to implement the example of FIG. 8, FIG. 8 shows a first example of implementation of the invention applied to the verification of software packages, FIG. 9 shows a second example of implementation of the invention applied to the verification of software packages, FIG. 10 schematically illustrates devices and data used to implement the example of FIG. 11, FIG. 11 illustrates an example of implementation of the invention applied to increasing the security of Internet browsers, FIG. 12 schematically shows devices and data used to implement the example of FIG. 13, and FIG. 13 shows an example of implementation of the invention applied to increasing the security of entails.

DETAILED DESCRIPTION

FIG. 1 schematically shows data and functions used to implement the invention according to its first or its second variant, in which a message 101 must be sent by a device A to a device B via a data transmission channel 109, which channel may be secure or unsecure.

The device A may be a personal computer or a smartphone, and the device B an email server, the message 101 for example being an email sent by the computer or the phone via the Internet.

The device A may also be a server sending an email or a webpage, the device B then being a personal computer or a smartphone receiving said email or web page.

The device A may even be a measuring apparatus, for example for measuring the consumption of electricity, of gas or of water, or for measuring the wear of a part in a machine, the message 101 then being the result of such a measurement, and the device B a server that gathers the measurements and communicates with the measuring apparatus via a telecommunications network, for example an Internet of things, a Wi-Fi network or an LTE network.

The devices A and B may also be personal computers or smartphones.

The device A may be a web browser, the device B a web server and the message 101 a form filled in by the user of the browser A, the reception of the message not needing to be differentiated with respect to its transmission.

The devices A and B may each be equipped with a processor for executing the steps of the method according to the invention, and with a memory for saving the data required for this execution.

The device B has available to it encryption/decryption data 102B, such as a private key.

The device A has available to it encryption/decryption data 102A, such as the public key associated with the private key 102B.

The device A also has available to it encryption/decryption data 103A, such as a private key associated with a public key 103B present in the device B.

The devices A and B possess random-number generators 104A and 104B, respectively, a common mixing function 105A, 105B and a common hash function 106A, 106B.

The devices A and B also have encrypting functions 107A and 107B, respectively, and decrypting functions 108A and 108B, respectively.

FIG. 2 illustrates an example of implementation of the method according to the first variant of the invention.

In step 201, a first number, used to identify the message 101, is generated by the device A. It may optionally be generated using the random-number generator 104A.

In step 202, the first number is added to the message 101. This addition may be a concatenation in any order defined by the communication protocol used between the two devices.

In step 203, the device A sends the data resulting from step 202 to the device B via the data transmission channel 109.

In step 204, on reception of the data, the device B randomly generates a second number using the random-number generator 104B.

In step 205, the device B makes use of the mixing function 105B to mix the second number with the message 101. By way of example, this mixing function is an XOR operating between the bits of the second number and the same number of bits of the message 101. The mixing function 105 is known by the device A.

In step 206, the device B uses the hash function 106 to hash the data obtained in the preceding step. The device B also uses the public encryption key 103B and the encrypting function 107B, to encrypt the second number.

In step 207, the device B sends to the device A via the channel 109 the first number and the encrypted second number.

In step 208, on reception of the two numbers, the device A decrypts the second number using the private encryption key 103A associated with the public key 103B that was necessarily used for the encryption, and the decryption function 108A associated with the encryption function 107B. If the second number was not encrypted by the device B, its decryption will be erroneous.

With the first number, the device A is able to identify the message 101, and to mix, using the mixing function 105, the decrypted second number with the identified message 101.

In step 209, the device A uses the hash function 106A to hash the data resulting from the preceding step.

In step 210, the device A uses the private encryption key 103A and the encrypting function 107A to encrypt the hash obtained in the preceding step.

In step 211, the device A sends the encrypted hash to the device B via the channel 109.

In step 212, on reception of the encrypted hash, the device B decrypts it using the public encryption key 103B associated with the private key 103A that was necessarily used for the encryption, and the decrypting function 108B associated with the encrypting function 107A.

In step 213, the device B compares the decrypted hash obtained in step 212 with the hash computed in step 206. If the two hashes are identical, the device B concludes that the message 101 has not been altered.

Preferably, the second number used in the mixing must be kept secret until the hashes have been compared to carry out the verification, but this mixer number may be revealed before, if it is possible to trust the devices that compute the hashes so that the data are not modified between the moment at which the mixer number is revealed and the comparison of the hashes.

FIG. 3 illustrates a second example of implementation of the method according to the second variant of the invention, the message 101 needing to be sent by the device A to the device B.

The devices A and B may be personal computers or smartphones, and the message 101 may be an email.

The devices A and B may be neighboring automobiles, the exchanged data then being information relating to their movements, and the connection being achieved via a data link between the two vehicles, for example a 5G link, a Low-Energy Bluetooth link, an ultrahigh frequency RFID link, a Lora link or a Sigfox link.

In step 301, a random number is generated by the device A, using the random number generator 104A.

In step 302, the device A mixes the message 101 with the random number using the mixing function 105A.

In step 303, the device A hashes the mixed data resulting from the preceding step, using the hash function 106.

In step 304, the device A encrypts the hash obtained in the preceding step using the encrypting function 107A and the private encryption key 103A.

In step 305, the device A encrypts the random number using the encrypting function 107A and the public encryption key 102A.

In step 306, the message 101, the encrypted random number and the encrypted hash are sent to the device B via the transmission channel 109, using the communication protocol agreed between the two devices.

In step 307, on reception of the data, the device B uses the decrypting function 108B and the public encryption key 103B to decrypt the hash, and the private encryption key 102B to decrypt the random number.

The device B is thus able to authenticate the device A.

In step 308, the device B mixes the message 101 with the random number, using the mixing function 105B.

In step 309, the device B hashes the mixed data resulting from the preceding step, using the hash function 106B.

In step 310, the device B compares the hash that it computed with the decrypted hash, and makes a conclusion as regards the integrity of the message 101.

In this example, the device B may forward the data received from device A to a third device. The device B decrypts, using the private key 102B the random number that it received from the device A before encrypting it again using the public key of the third device. The device B then transmits, to the third device, the encrypted random number and the hash encrypted by the device A. The third device, which has available to it the public key of the device A, will be able to verify that this hash indeed came from the device A, insofar as the device B did not modify the hash encrypted by the device A. A given dataset may therefore be verified as authentic by many users. This option however exposes the security of the certification, a fraudulent device being able to decrypt the random number, and potentially modify the message so that it has the same random hash as the initial hash. This implementation is therefore preferably used to certify the communication between computer systems formed from elements protected against such a fraudulent use.

FIG. 4 schematically illustrates the data and functions required to implement the invention according to its third variant, to verify that a file 401A present on a device A is identical to a file 401B present on a device B.

The devices A and B communicate via a transmission channel 409A, 409B that is for example a Wi-Fi network.

The device A possesses a random-number generator 404A.

The devices A and B have in common a mixing function 405A, 405B, a hash function 406A, 406B and a symmetric encryption key 410A, 410B.

The device B has available to it an encrypting function 407B.

The device A has available to it a decrypting function 408A.

FIG. 5 illustrates a third example of implementation of the method according to the third variant of the invention.

In step 501, a random number is generated in device A using the random-number generator 404.

In step 502, a modified copy of the file 401A is created using the mixing function 405A and the random number.

In step 503, the modified copy of the file 401A is hashed using the hash function 406A.

In step 504, the random number is encrypted using a symmetric encrypting algorithm and the symmetric encryption key 410A, and is sent to the device B via the transmission channel 409A.

In step 505, on reception of the encrypted random number, the device B decrypts it and uses it in a mixing function 405B to create a modified copy of the file 401B. By decrypting the random number, the device B can verify the identity of the device A.

In step 506, the modified copy of the file 401B is hashed with the same hash function 406B.

In step 507, the hash of the modified copy is encrypted using the encrypting function 407B and the encryption key 410B.

In step 508, the encrypted hash is sent to the device A.

In step 509, on reception of the encrypted hash, the device A decrypts it using the decrypting function 408A and the key 410A.

In step 510, the device A compares the decrypted hash to the hash that it calculated in step 503, and thus is able to verify whether the two files 401A and 401B are identical.

FIG. 6 illustrates a fourth example of implementation of the method according to the fourth variant of the invention, for verifying that a file has not been modified between two times d1 and d2, while keeping completely secure between the two times a smaller dataset, this set comprising a number that is kept intact and secret and a hash that is kept intact and preferably secret.

In step 601, a random number is generated.

In step 602, at the time d1, a modified copy of the file is created using the generated random number and a mixing function, this function for example consisting in adding the random number to the end of the file.

In step 603, a hash of the modified copy is created, for example using the SHA2 function.

In step 604, the random number and the hash are stored securely and secretly, so that they cannot be modified and such that the random number is not disclosed to a third party.

In step 605, at the time d2, the person or the device having access to the information stored in step 604 desires to compare the file at the time d2 with the file used in steps 601 to 604. To do this, the saved random number is used to create a second modified copy of the file at the time d2, using the same mixing function as in step 602.

In step 606, a hash of the second modified copy is created using the same hash function as in step 603.

In step 607, the hash created in the preceding step is compared with the stored hash in order to ensure that the file has not been modified between the times d1 and d2.

FIG. 7 schematically illustrates the keys necessary to implement a fifth example, shown in FIG. 8, of the method according to the invention applied to the verification of software packages.

In the rest of the description, the operation of mixing a datum with a random mixer number followed by the hashing operation will be referred to as "random hashing" of this datum.

The example shown in the FIG. 8 is implemented between two devices: a device A called the software distributor and a device B called the client device.

Device A possesses two keys 701 and 702.

701 is a key serving to encrypt a hash, and is preferably private.

702 is a key serving to encrypt a random number, and is preferably public.

The device B possesses two keys 703 and 704.

703 is a key used to decrypt a hash encrypted using the key 701, and is preferably public.

704 is a key that is used to decrypt a random number encrypted using the key 702, and is preferably private.

The pair of keys (701, 703) is what may be called the pair of keys of the software distributor, the latter being able to use it to communicate with all the apparatuses on which one of the software packages that it distributes is installed.

The pair of keys (704, 702) is what may be called the pair of keys of the client, the latter being able to use it for all the software packages that it verifies during their download.

In step 801, the software distributor A carries out a random hashing of a software package to be transmitted to client B, in steps 301 to 305 described above with reference to FIG. 3.

The software distributor A uses the key 702 to encrypt the random number and the key 701 to encrypt the random hash of the software package.

In step 802, the software distributor A sends, to the client B, a dataset containing the software package, the encrypted hash of the software package and the encrypted random number, over a transmission line that may be secure or unsecure.

In step 803, on reception of the data set, the client B decrypts the hash with the key 703 and the random number with the key 704. The client B then uses the random number to carry out the random hashing of the received software package.

In step 804, if the computed hash is identical to the received hash, the client B permits the execution of the received software package, or replaces the preceding version of the software package with the version that it has just received.

In step 805, for greater security, steps 803 and 804 are re-executed at pre-programmed time intervals in order to verify the authenticity of the software package.

FIG. 9 describes another possible implementation of the random hashing, for verifying that the software package in the process of being downloaded is permitted by a software package in the process of being executed on an apparatus.

In step 901, the apparatus uses the method illustrated in FIG. 2 to verify that a received software package originates from a reliable source.

In step 902, steps 601 to 604 of FIG. 6 are executed to create, in the apparatus, a secure signature of the software package.

In step 903, before using the software package, steps 605 to 607 of FIG. 6 are executed to verify that the software package has not been modified since step 902.

FIG. 10 shows the objects necessary to implement the example illustrated in FIG. 11, allowing the security of data displayed by web browsers to be increased.

A web browser 1001 has available to it a pair of asymmetric keys that consist of a private key 1002*p* and a public key 1002*u*.

A server 1003*s*, which delivers to the browser the public keys of secure Internet sites 1004*s*, possesses pair of asymmetric keys 1003 consisting of a private key 1003*p* and a public key 1003*u*.

The Internet site 1004*s* possesses a pair of asymmetric keys 1004 consisting of a private key 1004*p* and a public key 1004*u*.

It step 1101, a user enters, into the address bar of the browser 1001 the URL address of the site that he desires to consult.

In step 1102, the browser 1001 uses the pair of keys 1002 and sends, to the server 1003*s*, the following information:
the URL, address of the site that the user desires to consult,
the public key 1002*u* of the browser, and
the URL address of the browser 1001 so that the server can respond thereto.

In step 1103, the server 1003*s* uses the method according to the invention illustrated in FIG. 2 to securely send to the browser the public key 1004*u* of the site 1004*s*.

The public key 1002*u* will be used by the server to decrypt the second number that the navigator sends thereto during the exchanges.

In step 1104, the browser 1001 sends to the site 1004*s* the following information:
the name of the page of the site that the user desires to consult,
the public key 1002*u* of the browser, and
the U address of the browser so that the site can respond thereto.

In step 1105, the server 1004s uses the method according to the invention illustrated in FIG. 2 to send to the browser securely the requested page.

FIG. 12 shows the objects required. to implement the example illustrated in FIG. 13, which allows the security of emails to be increased.

A first electronic device A, which may possibly be a computer or a smart phone, allows emails 1200 taking the form of electronic files to be sent, received, archived, edited and displayed.

This first device A has access to a pair of asymmetric keys 1201c consisting of a public key 1201u and a private key 1201p.

A second electronic device B allows emails 1200 to be sent, received, archived, edited and displayed.

This second device B has access to a pair of asymmetric keys 1202c consisting of a public key 1202u and a private key 1202p.

A server 1203 gathers the identification numbers and the public keys of electronic devices, such as A and B, certified to preserve the integrity of received emails and the confidentiality of the random numbers associated with the random hashing method according to the invention.

The server 1203 has access to a pair of keys 1203c consisting of a public key 1203u and of a private key 1203p. It will be noted that this server may have a plurality of pairs of keys, each pair dedicated to the communication with one clearly defined electronic device.

A server 1204 associates the one or more electronic devices with the destination address 1205 of the email.

The server 1204 has access to a pair of keys 1204c consisting of a public key 1204u and of a private key 1204p. It will be noted that this server may have a plurality of pairs of keys, each dedicated to communication with one clearly defined electronic device.

In step 1301, a user requests that the first device A send the email 1200 to the destination address 1205.

In step 1302, the first device A communicates with the server 1204, the public key of which it knows, using the method according to the invention illustrated in FIG. 2, in order to determine the identifier and the public key of the device B associated with the address 1205. After authentication of the first device A by the server 1204, the latter sends to the first device A the identifier and the public key of the device B. This is also done using the method illustrated in FIG. 2, the server 1204 knowing the public key of the device A and the latter knowing the public key of the server 1204. This method allows the device A to receive, from the server 1204, unmodified data. The server 1204 will itself have been able to obtain the public key of the device B from the server 1203 and, at the same time, to verify the public key of the device A.

In step 1303, the first device A communicates its identifier to the device B.

In step 1304, the device B, having received the identifier communicated in step 1303, communicates with the server 1203 in order to determine the public key of the first device A. This information is sent thereto using the method of FIG. 2, which allows the device B to receive unmodified information. The device B informs the device A of the reception of this information by sending thereto a reception acknowledgment.

In step 1305, on reception of the reception acknowledgment sent in step 1304, the first device A uses the method according to the invention illustrated in FIG. 2 to send the email 1200 to the device B, which may then be certain that this information was sent by the device A and has been received unaltered. In addition, the device A is certain to have certified this information only with the device B.

Since encrypting methods employing asymmetric keys and symmetric keys may be vulnerable to quantum computers, these encrypting methods may be replaced, in the examples described above, with encrypting methods using single-use keys.

The invention is not limited to the examples of embodiments described above, nor to the exemplified applications. The invention may in particular be used to increase the security of financial transactions.

The invention claimed is:

1. A method for verifying with an apparatus the integrity of a first dataset originating from a sender, the method comprising:

receiving, using one or more computing device processors, a first dataset, wherein the first dataset was sent by a sender;

determining, using the one or more computing device processors, a mixer number, wherein the mixer number is generated randomly;

obtaining, using the one or more computing device processors, and based on a mixing function, mixed data, wherein the mixing function comprises mixing the mixer number with the first dataset;

generating, using the one or more computing device processors, and based on a hash function, a hash, wherein the hash is a result of the hash function being applied to the mixed data;

receiving, using the one or more computing device processors, a second dataset, wherein the second dataset was sent by the sender, wherein the second dataset is encrypted, and wherein the encrypted second dataset is generated by the sender, wherein the generation of the second dataset comprises the sender obtaining a result by mixing the mixer number with the first dataset using the mixing function, further generating a second hash by applying the hash function to the result using the single-use key, and encrypting the second hash;

decrypting, using the one or more computing device processors, the second dataset using a single-use key, wherein the single-use key is used once by the sender to generate the encrypted second dataset and is used once by the apparatus for decrypting the encrypted second dataset, generating a decrypted second dataset, wherein the decrypted second dataset comprises the second hash;

comparing, using the one or more computing device processors, the hash with the decrypted second dataset;

in response to determining the hash and the decrypted second dataset are associated:
verifying an integrity of the first dataset,
wherein the mixer number is known to the sender and to the apparatus, and wherein the mixer number is not being shared with a third party;

counting, using the one or more computing device processors, a series of consecutive failed verification attempts; and ceasing comparison when the series of consecutive failed verification attempts reaches a predetermined number, wherein, in response to the ceasing comparison, the verifying continues after renewal of the single-use key, wherein the mixing function comprises adding the mixer number to an end of the first dataset, being carried out in an environment where non protected data transmission can be altered with the use of quantum computers.

2. The method according to claim 1, further comprising sending the mixer number to the sender, keeping the mixer number secret.

3. The method according to claim 2, wherein the mixer number being sent encrypted using the single-use key, and wherein the mixer number is decrypted by the sender.

4. The method according to claim 2, wherein an identifier of the mixer number is sent to the sender of the message, the sender retrieving from a file or a memory the mixer number associated with the identifier.

5. The method according to claim 1, for verifying with the apparatus the integrity of a message forming the first dataset, the apparatus receiving the mixer number which is encrypted.

6. The method according to claim 1, the hash function being chosen among SHA1, SHA2, SHA256, MD5 and the Jenkins function.

7. A non-transitory computer-program product containing instructions readable by the processor of an apparatus, for implementing the method according to claim 1.

8. The method according to claim 1, further comprising:
receiving an identifier of the mixer number;
verifying the integrity of a message forming the first dataset using the identifier of the mixer number.

9. The method according to claim 8, wherein the number associated to the identifier of the mixer number is retrieved from a memory, a file, or a data server, and wherein the number associated to the identifier of the mixer number is the mixer number.

10. The method according to claim 1, further comprising:
receiving, sent by the sender, an identifier of the first dataset;
identifying, based on the identifier of the first dataset, the first dataset.

11. The method according to claim 10, wherein the identifier of the first dataset comprises an identifier of the sender.

12. The method according to claim 1, further comprising:
receiving, sent by the sender, an identifier of the sender;
choosing, based on the identifier of the sender, a correct encryption key associated with the sender.

13. An apparatus for verifying the integrity of a first dataset originating from a sender, the apparatus comprising:
at least one memory comprising instructions; and
at least one processing device configured for executing instructions, wherein the instructions cause the at least one processing device to perform operations of:
receiving a first dataset, wherein the first dataset was sent by a sender;
determining a mixer number, wherein the mixer number is generated randomly;
obtaining, based on a mixing function, mixed data, wherein the mixing function comprises mixing the mixer number with the first dataset;
generating, based on a hash function, a hash, wherein the hash is a result of the hash function being applied to the mixed data;
receiving a second dataset, wherein the second dataset was sent by the sender, wherein the second dataset is encrypted, and wherein the encrypted second dataset is generated by the sender, wherein the generation of the second dataset comprises the sender obtaining a result by mixing the mixer number with the first dataset using the mixing function, further generating a second hash by applying the hash function to the result using the single-use key, and encrypting the second hash;
decrypting the second dataset using a single-use key, wherein the single-use key is used once by the sender to generate the encrypted second dataset and is used once by the apparatus for decrypting the encrypted second dataset, generating a decrypted second dataset, wherein the decrypted second dataset comprises the second hash;
comparing the hash with the decrypted second dataset;
in response to determining the hash and the decrypted second dataset are associated:
verifying an integrity of the first dataset,
counting, using the one or more computing device processors, a series of consecutive failed verification attempts; and
ceasing comparison when the series of consecutive failed verification attempts reaches a predetermined number,
wherein, in response to the ceasing comparison, the verifying continues after renewal of the single-use key, and
wherein the mixer number is known to the sender and to the apparatus, and wherein the mixer number is not being shared with a third party,
wherein the mixing function comprises adding the mixer number to an end of the first dataset,
being carried out in an environment where non protected data transmission can be altered with the use of quantum computers.

14. The apparatus according to claim 13, further comprising sending the mixer number to the sender, keeping the mixer number secret.

15. A method for verifying with an apparatus the integrity of a first dataset originating from a sender, the method comprising:
receiving, using one or more computing device processors, a first dataset, wherein the first dataset was sent by a sender;
determining, using the one or more computing device processors, a mixer number, wherein the mixer number is generated randomly;
obtaining, using the one or more computing device processors, and based on a mixing function, mixed data, wherein the mixing function comprises mixing the mixer number with the first dataset, the mixing function being an XOR logic function or consisting in adding the mixer number to the end of the first dataset or being an encrypting function using the mixer number as encryption key to encrypt the first dataset;
generating, using the one or more computing device processors, and based on a hash function, a hash, wherein the hash is a result of the hash function being applied to the mixed data, and wherein the hash function is selected from the group consisting of SHA1, SHA2, SHA256, MD5, and the Jenkins function;
receiving, using the one or more computing device processors, a second dataset, wherein the second dataset was sent by the sender, wherein the second dataset is encrypted, and wherein the encrypted second dataset is generated by the sender, wherein the generation of the second dataset comprises the sender obtaining a result by mixing the mixer number with the first dataset using the mixing function, further generating a second hash by applying the hash function to the result using the single-use key, and encrypting the second hash;
decrypting, using the one or more computing device processors, the second dataset using a single-use key, wherein the single-use key is used once by the sender to generate the encrypted second dataset and is used once by the apparatus for decrypting the encrypted second dataset, generating a decrypted second dataset, wherein the decrypted second dataset comprises the second hash;

comparing, using the one or more computing device processors, the hash with the decrypted second dataset;

in response to determining the hash and the decrypted second dataset are associated:

verifying an integrity of the first dataset;

counting, using the one or more computing device processors, a series of consecutive failed verification attempts; and ceasing comparison when the series of consecutive failed verification attempts reaches a predetermined number, wherein, in response to the ceasing comparison, the verifying continues after renewal of the single-use key, wherein the mixer number is known to the sender and to the apparatus, wherein the mixer number is not being shared with a third party, and wherein the mixer number is encrypted, and wherein the mixer number is associated with physical quantities, and wherein at least one of the physical quantities varies continuously, wherein the mixing function comprises adding the mixer number to an end of the first dataset, being carried out in an environment where non protected data transmission can be altered with the use of quantum computers.

16. The method according to claim 15, further comprising sending the mixer number to the sender, keeping the mixer number secret.

17. The method according to claim 16, wherein an identifier of the mixer number is sent to the sender of the message, the sender retrieving from a file or a memory the mixer number associated with the identifier.

18. The method according to claim 15, for verifying with the apparatus the integrity of a message forming the first dataset, the apparatus receiving the mixer number which is encrypted.

19. The method according to claim 15, further comprising:

receiving an identifier of the mixer number;

verifying the integrity of a message forming the first dataset using the identifier of the mixer number.

20. The method according to claim 19, wherein a number associated to the identifier of the mixer number is retrieved from a memory, a file, or a data server, and wherein the number associated to the identifier of the mixer number is the mixer number.

* * * * *